Jan. 3, 1928.
P. J. RIVERS
1,654,754
WHEEL RIM CONTRACTING DEVICE
Filed Jan. 10, 1927
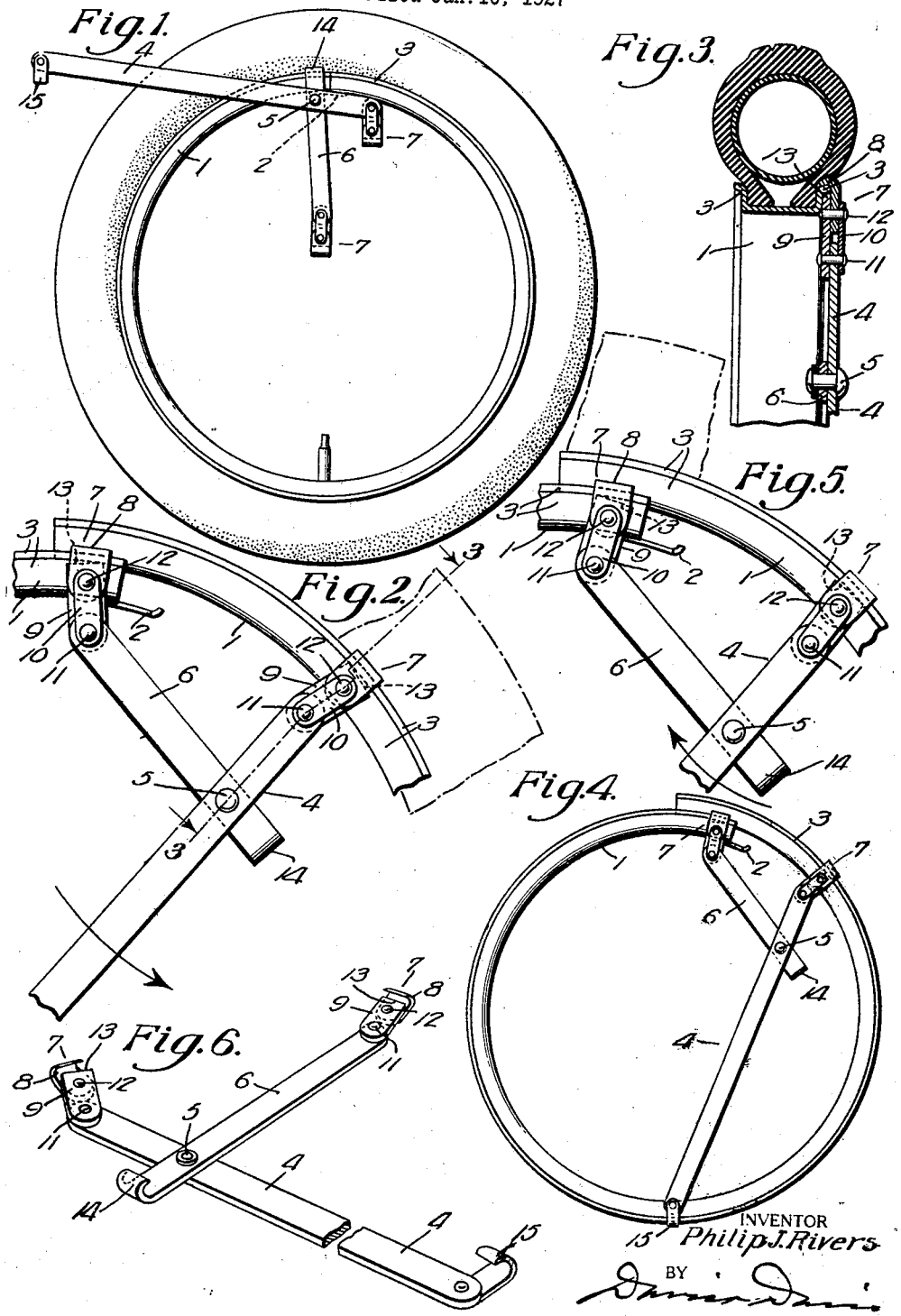
INVENTOR
*Philip J. Rivers*
BY
ATTORNEYS Patented Jan. 3, 1928.

1,654,754

UNITED STATES PATENT OFFICE.

PHILIP J. RIVERS, OF NEW ROCHELLE, NEW YORK.

WHEEL-RIM-CONTRACTING DEVICE.

Application filed January 10, 1927. Serial No. 160,116.

An object of the present invention is to provide a small, portable and collapsible tool of improved form for use in contracting the demountable rim of an automobile wheel in order to release the tire shoe and permit it to be removed from the rim.

Another object of the invention is to provide a device of this character which is particularly designed to facilitate the breaking of the joint in the wheel rim preliminary to the contraction thereof.

A further object of the invention is to provide a tool of this character designed also to control the expansion of the wheel rim to its original form after it has been contracted by the tool.

In the drawings:

Fig. 1 is a side elevation of a demountable rim with a tire shoe upon it, showing the device applied to the rim for breaking the joint thereof;

Fig. 2 a fragmentary side elevation upon a larger scale showing the device applied to the wheel rim and operated to contract it;

Fig. 3 a section taken on the line 3—3 of Fig. 2;

Fig. 4 a side elevation of the rim contracted and locked in its contracted condition by the device;

Fig. 5 a view similar to Fig. 2 showing the device operated for the expansion of the rim; and Fig. 6 a perspective view of the device.

Referring by numerals to the various parts, 1 designates the wheel rim which may be of any suitable form of the split demountable type. The ends of such a rim are usually locked together by a device indicated at 2. These locking devices are made in several different forms and are adapted to be released by forcibly operating upon the rim at the joint. The rim 1 is formed with the usual outturned shoe-retaining flanges 3.

The contracting device consists of a lever in the form of a long, straight, rigid bar 4. Pivotally connected to the bar 4 a short distance from one end thereof, as at 5, is a shorter pull-bar 6. The pivot 5 is located near one end of the bar 6. Each bar is thus formed with a short arm and a long arm at opposite sides of the pivot. The short arm of the lever 4 and the long arm of the bar 6 each carries at its outer end a similar device 7 for detachably connecting it to the flange 3 of the rim 1. Each of these connecting devices consists of a hook 8 and a pair of inner and outer short links 9 and 10 respectively. The links are pivotally connected at their inner ends as at 11 to the bar 4 or to the bar 6 and their outer ends are pivotally connected as at 12 to the hook 8. The hook is of material width and is formed to fit over the outturned edge of the rim flange 3 as shown in Fig. 3. The link 9 is also of material width and its outer end is formed with a straight edge 13 opposed to the inner or under face of the hook 8. This edge 13 and the said face of the hook are spaced apart to receive the outer edge of the flange 3 between them.

The short arm of the pull-bar 6 is integrally formed at its end with a rigid hook 14 designed to engage the outer edge of the rim flange 3. At the end of the long arm of the lever 4 is pivoted a locking hook 15 also designed to engage the edge of the rim flange.

To remove a tire shoe from the rim it is necessary first to release the locking means 2 and break the rim joint. To accomplish this, the device is applied as shown in Fig. 1. The rigid hook 14 on the short arm of the pull bar 6 is now in engagement with the outer edge of the rim flange 3. The shiftably mounted attaching or anchor device 7 carried by the short arm of the lever 4 is swung down out of the way and the end of said arm is directly engaged with the inner side of the rim 1. This arrangement gives the lever a great mechanical advantage and when a downward pressure, as viewed in Fig. 1, is applied to the end of its long arm the hook 14 will be pulled straight down to exert a powerful substantially radial breaking force upon the rim at a point closely adjacent to the joint and cause the locking means 2 to be released.

When the rim joint has been broken the hook 14 is disengaged from the rim flange 3; the pull bar 6 and the lever 4 are swung around their pivot 5 to the positions shown in Fig. 2, and the connecting devices 7 are engaged with the flange 3 at opposite sides of the broken joint. The long arm of the lever is then swung in the direction indicated by the arrow. This movement of the lever first causes the pull bar 6 and the short arm of the lever to rock the links 9 and 10 relatively to the hooks 8 about their pivots 12 and exert a pull upon said links at an angle to the radial lines of the rim extending through the hooks. This stress forces the edge 13 of each link 9 into tight engagement with the rim flange 3 at a point located at one side of the pivot 12. The end of said edge bites into the under side of the flange and the hook 8 is drawn down into binding engagement with the upper side of the flange. The hooks 8 are thus firmly held against slipping either circumferentially or laterally of the rim and a continued movement of the lever causes the rim to be contracted. The power applied to the bar 6 will pull the end of the rim to which it is connected inwardly and carry it inside of the other end of the rim as shown in Fig. 2, thereby contracting the rim and freeing the shoe from it. When the rim has been contracted the locking hook 15 is engaged with the rim flange to lock the rim in its contracted condition. The tendency of the rim to expand will put a strain upon the bar 6 and, through said bar, upon the lever 4. This strain will cause the hook 15 to bind against the rim flange and thereby lock the device in position to hold the rim contracted.

When a tire shoe has been replaced upon the contracted rim the hook 15 is released from the rim flange and the lever 4 is grasped to control the expansion of the rim. If the surrounding shoe resists the complete expansion of the rim the lever is forced in the direction indicated by the arrow in Fig. 5. This will first rock the links 9 in an opposite direction to that shown in Fig. 2 and cause each edge 13 to engage the rim flange, at a point located at the opposite side of the pivot 12, and again bind the hooks 8 to the rim. Continued movement of the lever will expand the rim against the shoe resistance until the joint has been reestablished and the locking means reengaged.

A tool constructed as shown and described may be readily folded or collapsed and is, therefore, adapted to be carried in an ordinary tool box. It is clear that such a device may be used in a shop or carried as a part of the tool equipment of an automobile.

What I claim is:

1. As an article of manufacture a unitary device for disconnecting a rim from a tire, comprising a rigid lever; a rigid bar; means pivotally connecting together said bar and lever to provide the lever with a rigid long arm and a rigid short arm; means pivotally mounted directly on the end of the short arm of the lever to connect it to the outer edge of the rim flange, said pivotal means being adapted to be swung out of the way to permit the end of the lever to directly engage the inner side of the rim at one side of the rim joint; and means carried by one end of the said rigid bar to engage the rim flange on the outer side thereof at the other side of the joint and at a distance from the bar pivot materially less than the length of the short arm of the lever.

2. As an article of manufacture a tool for disconnecting a rim from a tire, comprising a rigid lever; a rigid bar; means pivotally connecting together said bar and lever intermediate their ends to provide each with a rigid long arm and a rigid short arm; the rigid short arm of the lever being adapted to engage the inner side of the rim; pivotal means mounted directly on the end of the short arm of the lever and adapted to engage the outer edge of the rim flange; and means carried by each end of the said rigid bar to engage the outer edge of the rim flange.

In testimony whereof I hereunto affix my signature.

PHILIP J. RIVERS.